United States Patent
Yokoi

(10) Patent No.: US 8,488,051 B2
(45) Date of Patent: Jul. 16, 2013

(54) IMAGE PICKUP APPARATUS AND CONTROL METHOD THEREFOR

(75) Inventor: Takaaki Yokoi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1168 days.

(21) Appl. No.: 12/119,861

(22) Filed: May 13, 2008

(65) Prior Publication Data

US 2008/0284870 A1    Nov. 20, 2008

(30) Foreign Application Priority Data

May 15, 2007   (JP) .................................. 2007-129405

(51) Int. Cl.
*H04N 5/232*       (2006.01)
*H04N 9/73*        (2006.01)

(52) U.S. Cl.
USPC ........................................ 348/349; 348/226.1

(58) Field of Classification Search
USPC ............. 348/226.1, 227.1, 228.1, 229.1, 345, 348/362, 221.1, 222.1, 349
See application file for complete search history.

(56) References Cited

U.S. PATENT DOCUMENTS

| | | | | |
|---|---|---|---|---|
| 6,091,452 A | * | 7/2000 | Nishiyama | .................... 348/349 |
| 7,289,144 B2 | * | 10/2007 | Arazaki | ..................... 348/228.1 |
| 7,920,175 B2 | * | 4/2011 | Kawarada | .................. 348/226.1 |

FOREIGN PATENT DOCUMENTS

| | | | |
|---|---|---|---|
| JP | 8-79595 A | | 3/1996 |
| JP | 11075109 A | * | 3/1999 |
| JP | 2001-186407 A | | 7/2001 |
| JP | 2006-330129 A | | 12/2006 |
| JP | 2006330129 A | * | 12/2006 |

OTHER PUBLICATIONS

Notification of First Office Action issued in corresponding Chinese Patent Application No. 200810098202.9 dated Aug. 14, 2009.

* cited by examiner

*Primary Examiner* — Chieh M Fan
*Assistant Examiner* — Ahmed A Berhan
(74) *Attorney, Agent, or Firm* — Rossi, Kimms & McDowell LLP

(57) ABSTRACT

An image pickup apparatus capable of performing favorable focusing operation when image signals are read out from an image pickup device at a high speed while flickers are occurring. Flickers are detected from image signals outputted from the image pickup device, while the image signals outputted from the image pickup device is stored. The image signals outputted from the image pickup device and the image signals stored in a first memory are synthesized depending on the flicker detection result. A position of a focus lens is adjusted by selectively using any one of the image signals outputted from the image pickup device and the synthesized image signal. When the image pickup device performs reading images in a cycle shorter than a flicker cycle, image synthesis is performed depending on the brightness of the image signals outputted from the image pickup device.

9 Claims, 10 Drawing Sheets

IMAGE PICKUP APPARATUS AND CONTROL METHOD THEREFOR

BACKGROUND OF THE INVENTION

1. Field of the Invention

The present invention relates to an image pickup apparatus and control method therefor, which take a measure for flickers in an arbitrary cycle in an image pickup device and accomplish autofocus for favorable focusing operation.

2. Description of the Related Art

Conventionally, an image pickup apparatus such as a digital video camera or a digital still camera employs a contrast detection method as a method for performing automatic focusing operation using an image signal obtained from an image pickup device such as a CCD.

In the contrast detection method, images are picked up sequentially by moving the position of a focus lens within a predetermined range, a focal point evaluation signal is computed from each image signal, the focusing position is obtained from a focal point evaluation value corresponding to the focal point evaluation signal. A focal point evaluation value is computed so as to be larger as a focal point gets closer to the focusing focal point such as by using a BPF (band-pass filter). Then, the position of the focus lens is controlled toward the position where the focal point evaluation value becomes the maximum so that the focusing state is achieved.

In the contrast detection method, a direction to move a focus lens is obtained from sequential focal point evaluation values. As such, the method has a problem in that favorable focusing operation is not possible if S/N ratios of image signals being the bases of the focal point evaluation values for comparison are largely different from one another. Particularly, it is greatly affected by flickers of fluorescent light.

FIG. 9 is a diagram illustrating an effect of fluorescent flickers when a cycle of readout from an image pickup device is 1/60 sec. and a flicker cycle due to a power supply frequency is 1/50 sec.

In FIG. 9, reference numeral 901 denotes a cycle of readout from an image pickup device, reference numeral 902 denotes accumulation time for the image pickup device, reference numeral 903 denotes brightness changes due to flickers of fluorescent light, reference numeral 904 denotes a cycle of sampling focal point evaluation values, and reference numeral 905 denotes image signals outputted from the image pickup device.

In FIG. 9, the brightness changes due to the flickers of fluorescent light during the accumulation time for the image pickup device differ from one another for respective read out image signals. Accordingly, sequential image signals have different S/N ratios, so that a focal point evaluation value varies even if an object does not change. As a result, favorable focusing operation cannot be performed.

There is a further problem in that while an S/N ratio is steadily low such as at a low-light intensity, a change in an image signal is minor due to a noise effect so that the favorable focusing operation cannot be performed similarly to the brightness changes due to flickers.

To solve the above problems, the following techniques have been proposed.

It is determined whether or not the light intensity is low by comparing a focal point evaluation value gained from an image signal and a comparison value. If the light intensity is sufficient, accumulation time for an image pickup device is modified; and if the light intensity is low, a cycle of sampling focal point evaluation values is modified. This eliminates a flicker effect (for example, see Japanese Patent Laid-Open Patent Publication (Kokai) No. 8-79595).

There has been also proposed a technique capable of eliminating a flicker effect by adjusting a gain of an image signal subjected to wave detection and computation for cancelling a flicker effect by using the computation result (for example, see Japanese Patent Laid-Open Patent Publication (Kokai) No. 2001-186407).

In recent yeas, apart from the above techniques, there has been proposed an image pickup apparatus which reads out image signals at a high speed and stores the signals. FIG. 10 is a diagram illustrating an effect of fluorescent flickers when a cycle of readout from an image pickup device is 1/500 sec. and a flicker cycle due to a power supply frequency is 1/50 sec. during fast readout from the image pickup device. In FIG. 10, reference numeral 1001 denotes a cycle of readout from the image pickup device, reference numeral 1002 denotes accumulation time for the image pickup device, reference numeral 1003 denotes brightness changes due to fluorescent flickers, reference numeral 1004 denotes a cycle of sampling focal point evaluation values, and reference numeral 1005 denotes image signals outputted from the image pickup device.

Such fast readout shortens a cycle of sampling focal point evaluation values, thereby improving autofocus responsiveness.

However, the method of modifying accumulation time for an image pickup device disclosed in the above Japanese Patent Laid-Open Patent Publication (Kokai) No. 8-79595 cannot eliminate a flicker effect if a read-out cycle for the image pickup device exceeds two times of a power supply frequency. The method of modifying a cycle sampling focal point evaluation values also has a problem in that autofocus responsiveness largely decreases.

Additionally, the method of adjusting a gain disclosed in the above Japanese Patent Laid-Open Patent Publication (Kokai) No. 2001-186407 does not improve an S/N ratio. As such, the method has a problem in that an S/N ratio is very low in a flicker valleys indicated by a triangle "▲" in FIG. 10 during fast readout so that favorable focusing operation is not possible.

SUMMARY OF THE INVENTION

The present invention provides an image pickup apparatus and control method therefor, which are capable of performing favorable focusing operation when image signals are read out from an image pickup device at a high speed while flickers are occurring.

In a first aspect of the present invention, there is provided an image pickup apparatus comprising a focus lens, an image pickup device, a flicker detection unit adapted to detect flickers from image signals outputted from the image pickup device, a storage unit adapted to store the image signals outputted from the image pickup device, an image synthesis unit adapted to synthesize the image signals outputted from the image pickup device and the image signals stored in the storage unit depending on a detection result by the flicker detection unit, and a focal point adjustment unit adapted to adjust a position of the focus lens by selectively using any one of the image signals outputted from the image pickup device and the image signal synthesized by the image synthesis unit, and when the image pickup device performs reading images in a cycle longer than a flicker cycle, the image synthesis unit performs image synthesis depending on the brightness of the image signals outputted from the image pickup device.

In a second aspect of the present invention, there is provided an image pickup apparatus comprising a detection unit adapted to detect a flicker from image signals outputted from an image pickup device, a storage unit adapted to store the image signals outputted from the image pickup device when the image pickup device performs reading images in a cycle longer than a flicker cycle, an image synthesis unit adapted to synthesize the image signals outputted from the image pickup device and the image signals stored in the storage unit depending on a detection result by the detection unit, and a focal point adjustment unit adapted to adjust a position of a focus lens by selectively using any one of the image signals outputted from the image pickup device and the image signal synthesized by the image synthesis unit.

In a third aspect of the present invention, there is provided an image pickup apparatus comprising a focus lens, an image pickup device, a flicker detection unit adapted to detect flickers from image signals outputted from the image pickup device, a correction unit adapted to correct the image signals outputted from the image pickup device dependent on a detection result by the flicker detection unit and a brightness level value of the image signal outputted from the image pickup device, and a focal point adjustment unit adapted to adjust a position of the focus lens based on the image signal corrected by the correction unit, and the image pickup device performs reading images in a cycle longer than a flicker cycle.

According to the present invention, if the image pickup device perform readout in a cycle shorter than a fluorescent flicker cycle, image synthesis is performed on image signals outputted from the image pickup device depending on the brightness of the image signals outputted from the image pickup device, and the position of a focus lens is adjusted by selectively using any one of the image signals outputted from the image pickup device and the synthesized image signals. As such, favorable focusing operation can be performed when image signals are read out from the image pickup device at a high speed while flickers are occurring.

Further features and advantages of the present invention will become apparent from the following detailed description of exemplary embodiments with reference to the attached drawings.

DETAILED DESCRIPTION OF THE PREFERRED EMBODIMENTS

The following will describe embodiments of the present invention in detail with reference to the drawings.

Figure 1:
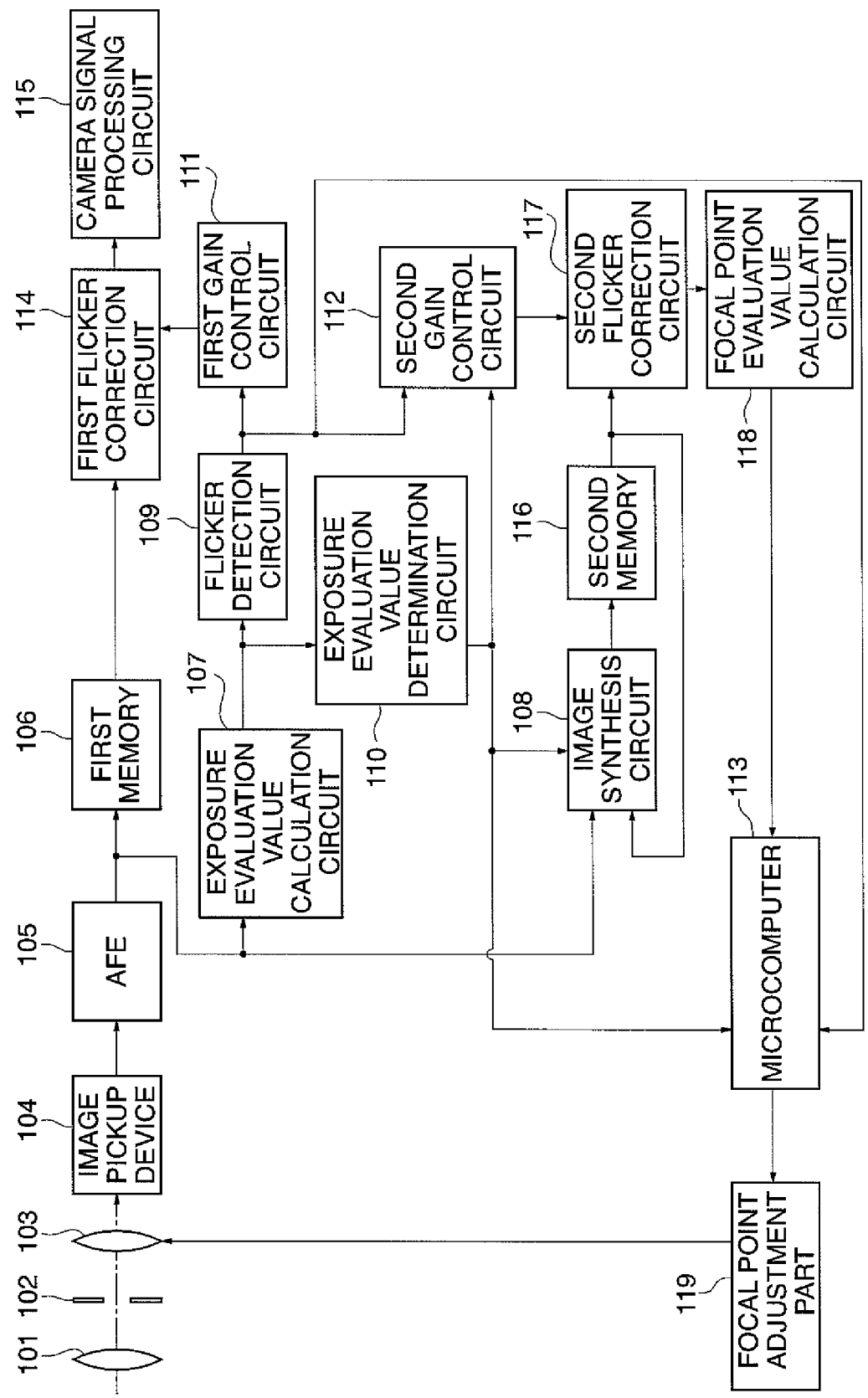
FIG. 1 is a block diagram schematically showing the configuration of an image pickup apparatus according to a first embodiment of the present invention.

FIG. 1 is a block diagram schematically showing the configuration of an image pickup apparatus according to a first embodiment of the present invention.

An object image enters an image pickup device 104 via a fixed lens 101, an aperture 102 and a focus lens 103 for performing focal point adjustment, and is photoelectrically converted to be outputted as image signals by the image pickup device 104.

The image signals outputted from the image pickup device 104 are subjected to co-related double sampling and A/D conversion and converted to digital signals in an analog front-end (AFE) 105. The image signals converted to the digital signals by the analog front-end 105 are outputted to a first memory 106, an exposure evaluation value calculation circuit 107, and an image synthesis circuit 108.

The first memory 106 stores the inputted image signals. The exposure evaluation value calculation circuit 107 integrates the brightness values of the image signals outputted from the analog front-end 105, calculates the exposure evaluation values in frames, and outputs the values to a flicker detection circuit 109 and an exposure evaluation value determination circuit 110.

The flicker detection circuit 109 detects whether or not the image signals are affected by a flicker component of fluorescent light by comparing the average value of the brightness values in the respective frames, and outputs the detection result to a first gain control circuit 111, a second gain control circuit 112, and a microcomputer 113.

The first gain control circuit 111 generates a first flicker correction gain to correct flickers depending on the flicker component detection result and outputs the gain to a first flicker correction circuit 114. The first flicker correction circuit 114 corrects the flicker component in the output of the first memory 106 with the first flicker correction gain and outputs the result to a camera signal processing circuit 115.

The camera signal processing circuit 115 performs signal processing for imaging such as aperture correction, gamma correction or white balance on the image signal subjected to flicker correction by the first flicker correction circuit 114. The output of the camera signal processing circuit 115 is stored as an output signal of a camera in a storage medium (not shown).

The exposure evaluation value determination circuit 110 compares the exposure evaluation value outputted (calculated) by the exposure evaluation value calculation circuit 107 with a predetermined value, and outputs the determination (comparison) result to the image synthesis circuit 108, the second gain control circuit 112, and the microcomputer 113.

The image synthesis circuit 108 performs additive synthesis on the image signals outputted from the analog front-end 105 and the image signals stored in the second memory 116 described hereinafter depending on the determination result by the exposure evaluation value determination circuit 110, and outputs those to the second memory 116 and a second flicker correction circuit 117 described hereinafter.

A second memory 116 stores the image signals outputted from the image synthesis circuit 108. The second gain control circuit 112 synthesizes the result of detecting flickers in a plurality of frames depending on the determination result by the exposure evaluation value determination circuit 110 to generate a second flicker correction gain to correct the flickers, and outputs the gain to the second flicker correction circuit 117.

The second flicker correction circuit 117 corrects the flickers of the output from the second memory 116 with the second flicker correction gain and outputs the result to a focal point evaluation value calculation circuit 118. The focal point evaluation value calculation circuit 118 extracts a high-frequency component in the output of the second flicker correction circuit 117 such that a signal becomes larger as a focal point gets closer to the focusing focal point, and outputs the extracted high-frequency component as a focal point evaluation value to the microcomputer 113.

The microcomputer 113 generates a control signal of the focus lens 103 from the determination result by the exposure evaluation value determination circuit 110, the detection result by the flicker detection circuit 109, and the focal point evaluation value by the focal point evaluation value calculation circuit 118, and outputs the signal to a focal point adjustment part 119. The focal point adjustment part 119 drives a driving apparatus (not shown) for driving the focus lens 103 depending on the control signal of the microcomputer 113 to adjust the position of the focus lens 103.

Figure 2:
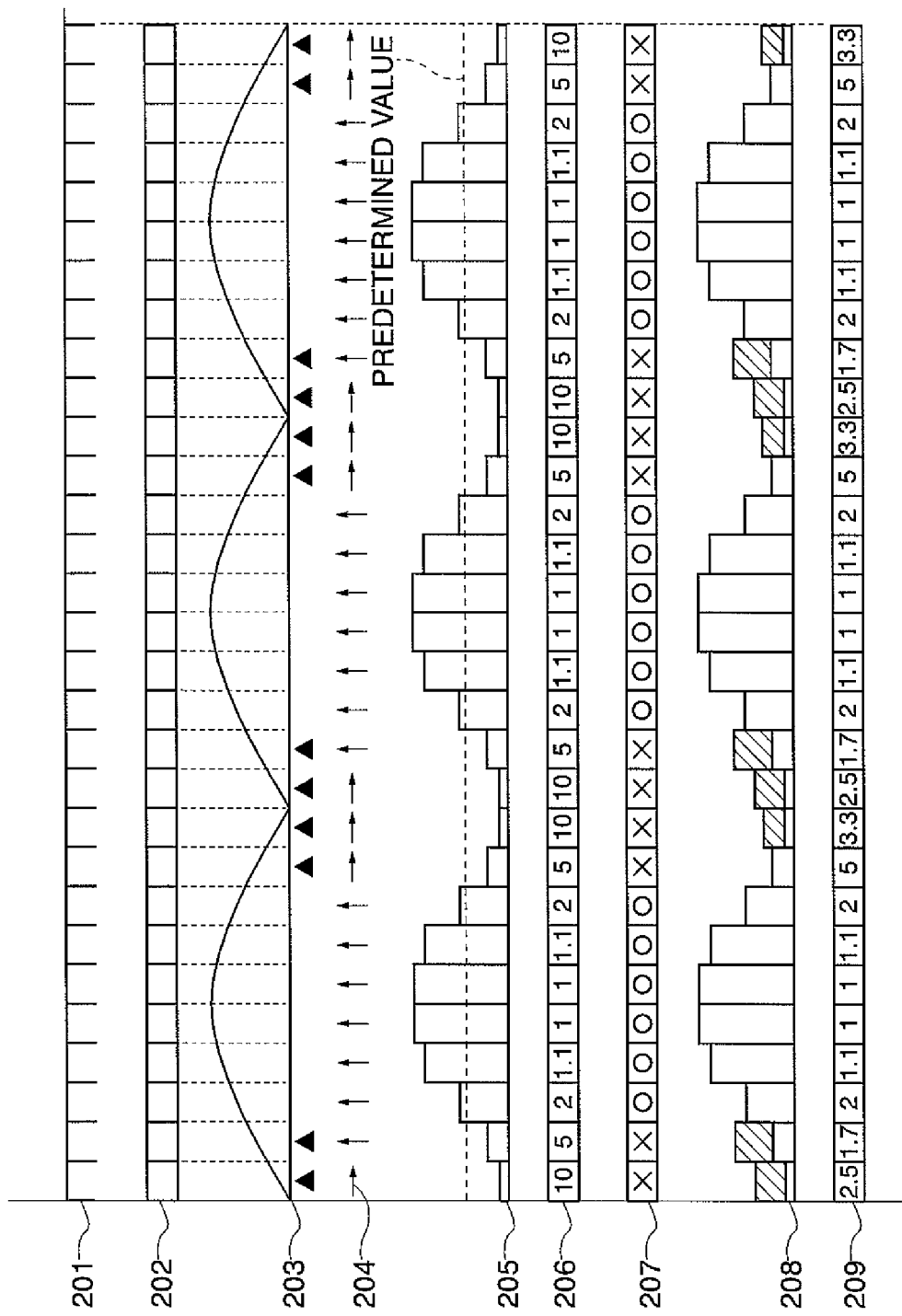
FIG. 2 is a timing chart illustrating the operation of the image pickup apparatus in FIG. 1.

FIG. 2 is a timing chart illustrating the operation of the image pickup apparatus in FIG. 1.

In FIG. 2, reference numeral 201 denotes a cycle of readout from the image pickup device 104, reference numeral 202 denotes accumulation time for the image pickup device 104, reference numeral 203 denotes brightness changes due to flickers of fluorescent light, reference numeral 204 denotes a cycle of sampling focal point evaluation values, reference numeral 205 denotes image signals outputted from the image pickup device 104, and reference numeral 206 denotes values of a first flicker correction gain to eliminate an effect of the flickers of fluorescent light, which represents a correction gain to eliminate the effect of fluorescent flickers included in image signals outputted from the image pickup device 104.

In a part corresponding to flicker valley labeled with a triangle "▲" in FIG. 2, the level for the output signal 205 of the image pickup device 104 is low so that the value of the first flicker correction gain is large. Reference numeral 207 denotes determination results by the exposure evaluation value determination circuit 110, in which "o" indicates that an exposure evaluation value by the exposure evaluation value calculation circuit 107 is larger than a predetermined value, while "x" indicates that the exposure evaluation value by the exposure evaluation value calculation circuit 107 is equal to or smaller than the predetermined value or less.

Reference numeral 208 denotes image signals outputted from the image synthesis circuit 108. A part represented with hatching represents an image signal stored in the second memory 116. If the exposure evaluation value determination result 207 is "x", the image synthesis circuit 108 performs additive synthesis on the image signals 205 outputted from the image pickup device 104 and image signals stored in the second memory 116, and stores the result in the second memory 116. If the determination result is "o", the circuit 108 stores only the image signals outputted from the image pickup device 104 in the second memory 116.

Reference numeral 209 denotes values of a second flicker correction gain to eliminate an effect of flickers of fluorescent light, which represents a correction gain to eliminate the effect of the flickers of fluorescent light included in image signals outputted from the image synthesis circuit 108.

If the exposure evaluation value determination result 207 is "x", the image synthesis circuit 108 performs additive synthesis processing on image signals in a superimposed manner. Accordingly, the second gain control circuit 112 synthesizes first flicker correction gains for the signals of the plurality of images subjected to the addition processing to generate second flicker correction gains for the image signals subjected to the additive synthesis.

The microcomputer 113 stores a plurality of the exposure evaluation value determination results 207 in an internal memory (not shown) for a predetermined number of times. Then, the microcomputer 113 generates a control signal of the focus lens 103 as in a flowchart in FIG. 3, described hereinafter, by using a detection result by the flicker detection circuit 109, a focal point evaluation value by the focal point evaluation value calculation circuit 118, and the determination results for a predetermined number of times stored in the internal memory.

As the above predetermined number of times, a period having a low S/N ratio value due to the flicker effect is calculated and set based on a flicker detection result and an exposure evaluation value determination result.

Figure 3:
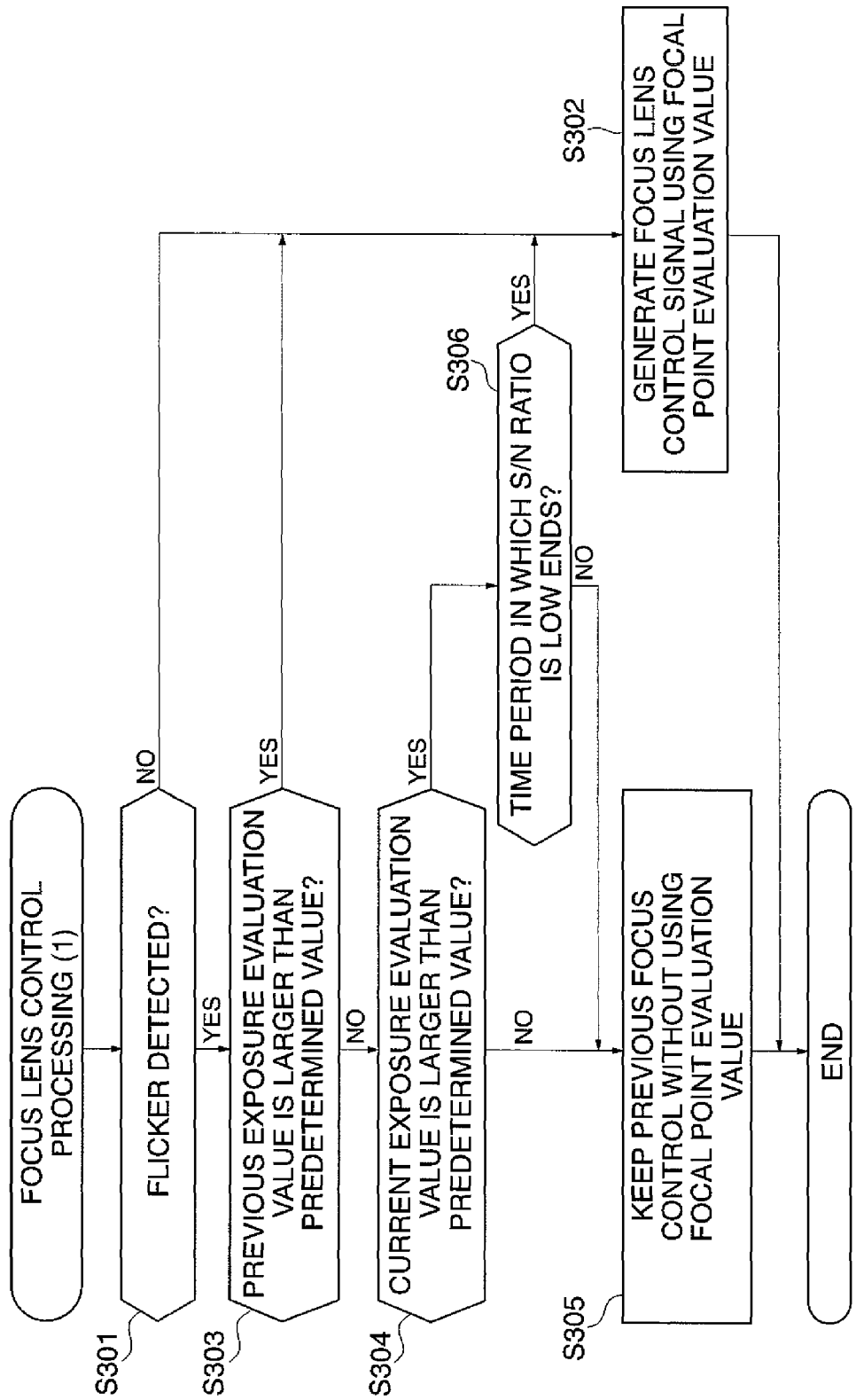
FIG. 3 is a flowchart showing a procedure of focus lens control (focal point adjustment) processing executed by the image pickup apparatus in FIG. 1.

FIG. 3 is a flowchart showing a procedure of focus lens control (focal point adjustment) processing executed by the image pickup apparatus in FIG. 1.

The focus lens control processing is executed through the operation of the focal point adjustment part 119 by the microcomputer 113 in FIG. 1.

In FIG. 3, first, a result of detecting a flicker is determined (step S301). If a flicker is not detected, a control signal of the focus lens 103 is generated using a focal point evaluation value (step S302), followed by terminating the process.

If a flicker is detected, it is determined whether or not the previous determination result by the exposure evaluation value determination circuit 110 is "o", i.e., the previous exposure evaluation value is larger than a predetermined value (step S303).

If the previous exposure evaluation value is larger than the predetermined value, it is decided that the current focal point evaluation value is generated from an image signal with a sufficient S/N ratio, and the control signal of the focus lens 103 is generated using the previous focal point evaluation value (step S302), followed by terminating the process.

If the previous exposure evaluation value is equal to or smaller than the predetermined value (NO to the step S303), it is determined whether or not the current determination result of the exposure evaluation value determination circuit 110 is "o", i.e., the current exposure evaluation value is larger than a predetermined value (step S304). If the current exposure evaluation value is equal to or smaller than the predetermined value, it is decided that the focal point evaluation value is generated from a low S/N ratio image signal. Then, the generation of the focus lens control signal from the current focal point evaluation value is stopped and the previous focus lens control is kept (step S305), followed by terminating the process. Namely, the microcomputer 113 temporarily prevents the focal point adjustment part 119 from adjusting the position of the focus lens 103 based on the low S/N ratio image signal synthesized by the image synthesis circuit 108, when it is determined by the exposure evaluation value determination circuit 110 that the brightness level value is equal to or smaller than a predetermined value.

If the current exposure evaluation value is larger than the predetermined value, a predetermined times of past determination results stored in the internal memory are checked and it is determined whether or not a time period in which the S/N ratio is low (hereinafter referred to as "low S/N ratio period")

ends (step S306). In the case where it is determined that low S/N ratio period ends, if all exposure evaluation values except for the current determination result are equal to or smaller than the predetermined value, it is determined that all the image signals during the low S/N ratio period are subjected to additive synthesis. Then, the control signal of the focus lens 103 is generated using the focal point evaluation value (step S302), followed by terminating the process.

If the low S/N ratio period does not end (NO to the step S306), then it is determined that the low S/N ratio period is lasting, the generation of the focus lens control signal from the focal point evaluation value is stopped and the immediately preceding focus lens control is kept (step S305), followed by terminating the process.

During the sampling cycle 204 for a focal point evaluation value in FIG. 2, an up-arrow indicates the case where the microcomputer 113 generates the control signal of the focus lens 103 using a focal point evaluation value calculated by the focal point evaluation value calculation circuit 118, while a right arrow indicates the case where there is no use of the focal point evaluation value.

In the present embodiment, the image signals are subjected to the additive synthesis during the low S/N ratio period due to the effect of flickers of fluorescent light, and then sampling of the focal point evaluation value is performed at a time. This prevents erroneous operations caused by using the focal point evaluation value calculated from the low S/N ratio image signal.

As described above, according to the present embodiment, the cycle of sampling a focal point evaluation value is maintained at a high speed during a favorable S/N ratio period and the sampling cycle is set to a low speed only during a low S/N ratio period. This enables favorable focusing operation during fast readout under fluorescent light without largely decreasing autofocus responsiveness by fast readout.

Next, a second embodiment of the present invention will be described. In this embodiment, the exposure evaluation value of the image signal synthesized by the image synthesis circuit 108 is calculated and a focal point evaluation value decided to have a favorable S/N ratio is used to control the focus lens 103 so that the number of sampling times of focal point evaluation values is increased.

Figure 4:
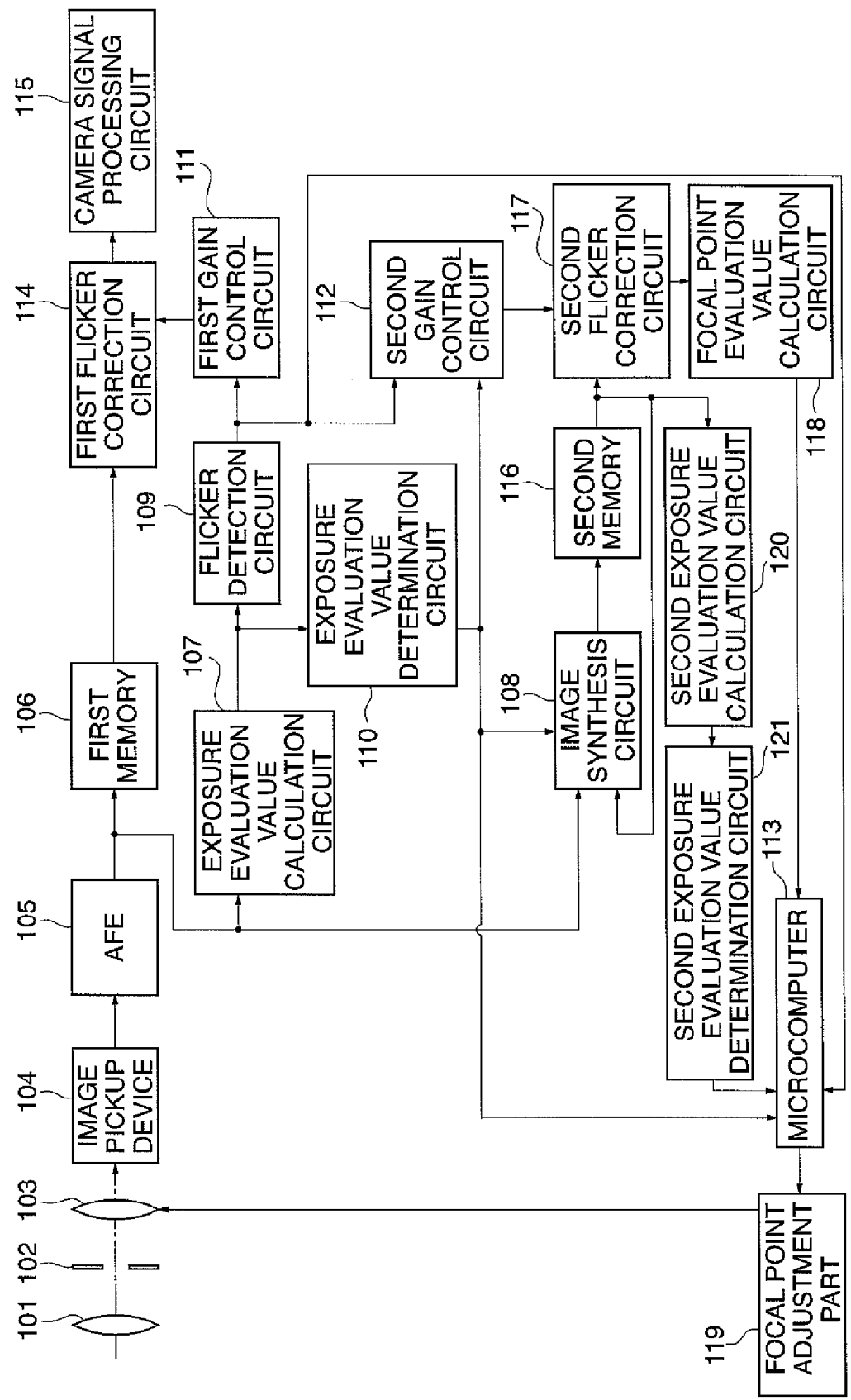
FIG. 4 is a block diagram schematically showing the configuration of an image pickup apparatus according to a second embodiment of the present invention.
Figure 5:
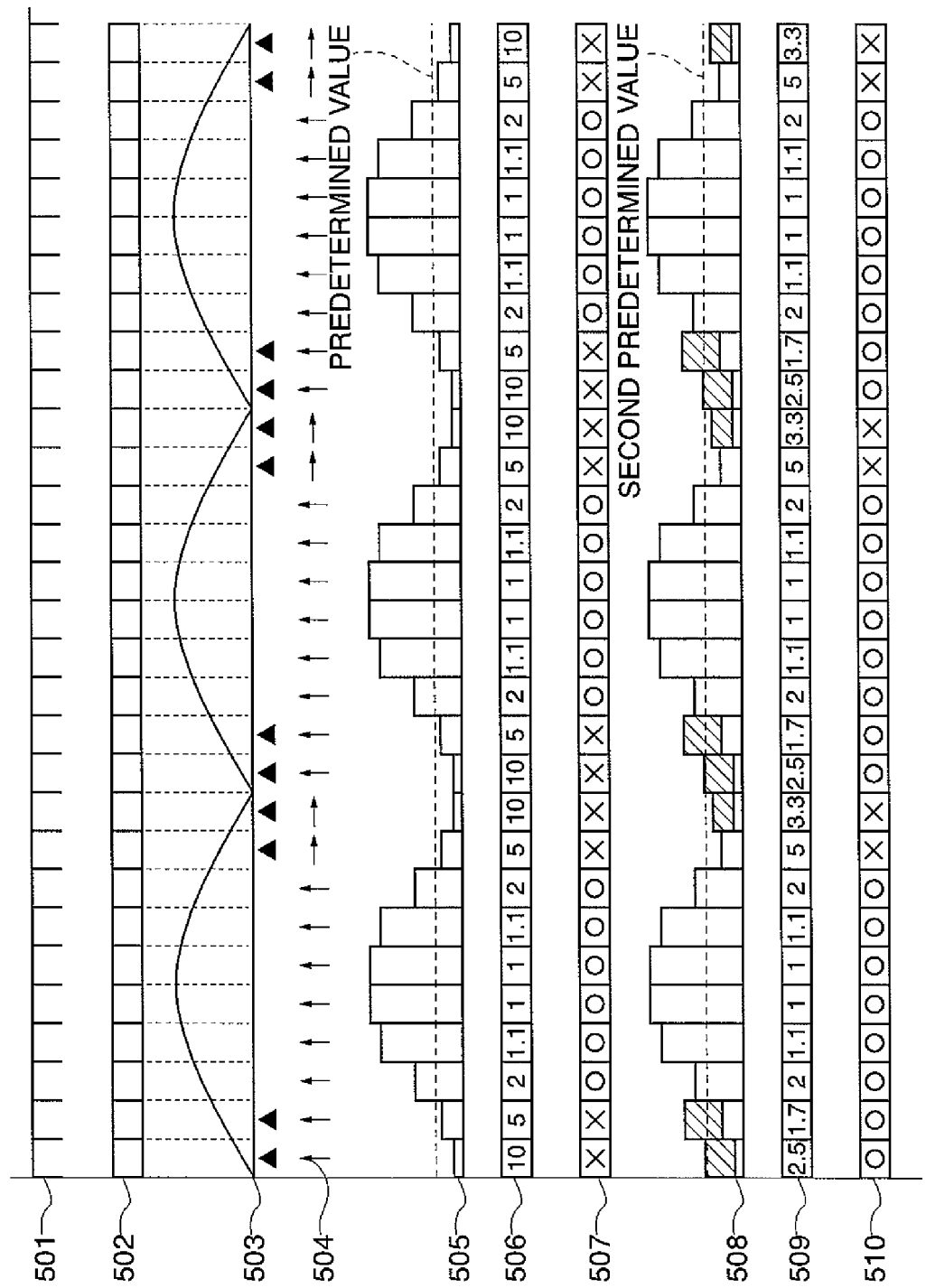
FIG. 5 is a timing chart illustrating the operation of the image pickup apparatus in FIG. 4.

FIG. 4 is a block diagram schematically showing the configuration of an image pickup apparatus according to the second embodiment of the present invention. FIG. 5 is a timing chart illustrating the operation of the image pickup apparatus in FIG. 4.

An image pickup apparatus according to the second embodiment has fundamentally the same construction as the first embodiment described above, and therefore corresponding elements are designated by identical reference numerals and description thereof is omitted. Only different points will be described below.

In FIG. 4, a second exposure evaluation value calculation circuit 120 integrates the brightness values of image signals outputted from the second memory 116, calculates an exposure evaluation value in a frame, and outputs the evaluation value to a second exposure evaluation value determination circuit 121.

The second exposure evaluation value determination circuit 121 compares the exposure evaluation value outputted from the second exposure evaluation value calculation circuit 120 with a predetermined value and outputs the determination (comparison) result to the microcomputer 113.

In FIG. 5, reference numeral 501 denotes a cycle of readout from the image pickup device 104, reference numeral 502 denotes accumulation time for the image pickup device 104, reference numeral 503 denotes brightness changes due to flickers of fluorescent light, reference numeral 504 denotes a cycle of sampling focal point evaluation values, reference numeral 505 denotes image signals outputted from the image pickup device 104, reference numeral 506 denotes values of a first flicker correction gain to eliminate an effect of the flickers of fluorescent light, reference numeral 507 denotes determination results by the exposure evaluation value determination circuit 110, reference numeral 508 denotes image signals outputted from the image synthesis circuit 108, reference numeral 509 denotes values of a second flicker correction gain to eliminate the effect of the flickers of fluorescent light, and reference numeral 510 denotes determination results by the second exposure evaluation value determination circuit 121, in which "o" indicates that an exposure evaluation value of the second exposure evaluation value calculation circuit 120 is larger than a second predetermined value, while "x" indicates that the exposure evaluation value of the second exposure evaluation value calculation circuit 120 is equal to or smaller than the second predetermined value.

The microcomputer 113 generates a control signal of the focus lens from a determination result by the exposure evaluation value determination circuit 110, a detection result by the flicker detection circuit 109, a focal point evaluation value by the focal point evaluation value calculation circuit 118, and a determination result by the second exposure evaluation value determination circuit 121. Then, the microcomputer 113 outputs the generated control signal to the focal point adjustment part 119. The focal point adjustment part 119 generates the control signal of the focus lens 103 as in a flowchart in FIG. 6, described hereinafter, depending on a control signal of the microcomputer 113.

Figure 6:
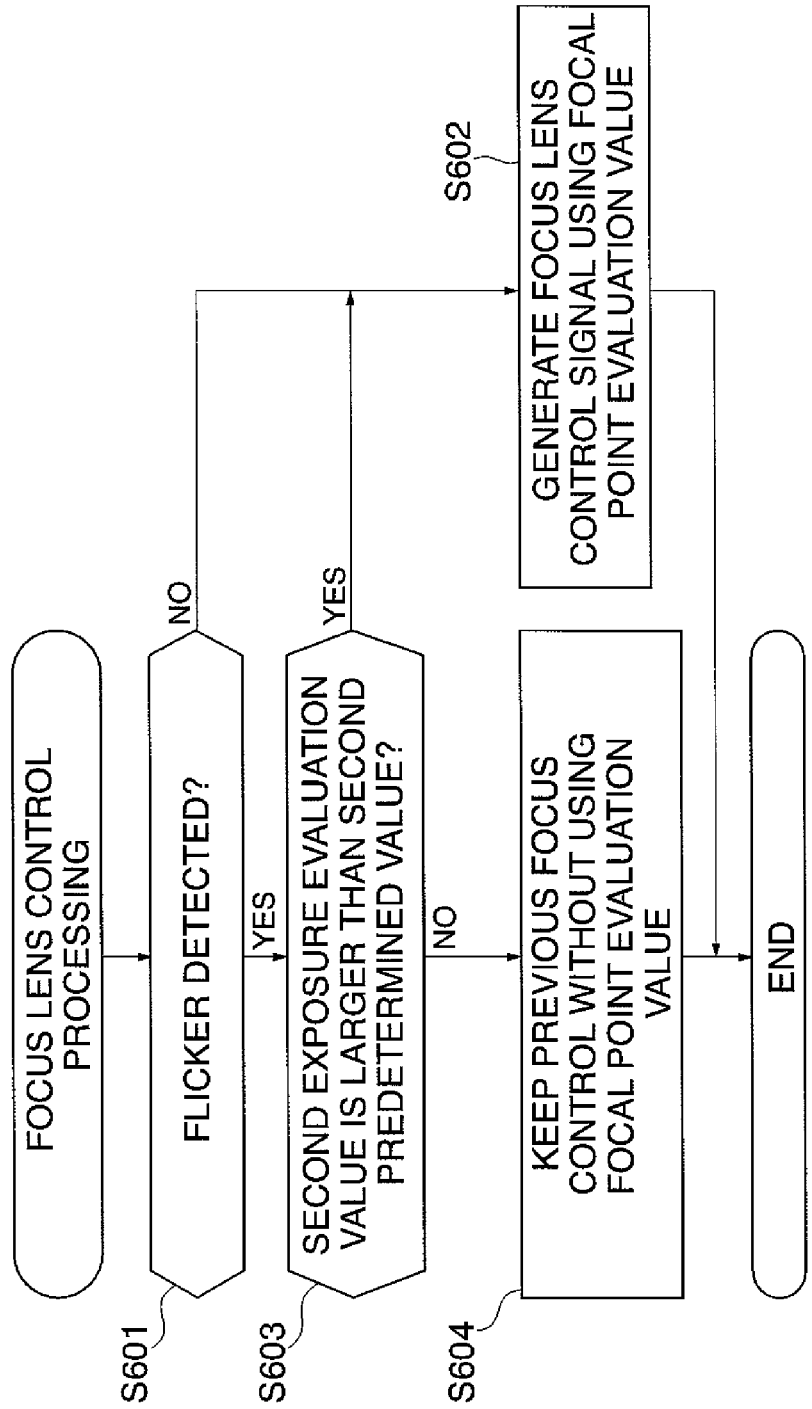
FIG. 6 is a flowchart showing a procedure of focus lens control (focal point adjustment) processing executed by the image pickup apparatus in FIG. 4.

FIG. 6 is a flowchart showing a procedure of focus lens control (focal point adjustment) processing executed by the image pickup apparatus in FIG. 4.

The focus lens control processing is executed through the operation of the focal point adjustment part 119 by the microcomputer 113 in FIG. 4.

In FIG. 6, first, a result of detecting a flicker is determined (step S601). If a flicker is not detected, a control (adjustment) signal of the focus lens 103 is generated using a focal point evaluation value (step S602), followed by terminating the process.

If a flicker is detected (YES to the step S601), it is determined whether or not the determination result by the second exposure evaluation value determination circuit 121 is "o", i.e., a second exposure evaluation value is larger than a second predetermined value (step S603).

If the second exposure evaluation value is larger than the second predetermined value, it is determined that the current focal point evaluation value is generated from an image signal with a sufficient S/N ratio, and the control signal of the focus lens 103 is generated using the second focal point evaluation value (step S602), followed by terminating the process.

If the second exposure evaluation value is equal to or smaller than the second predetermined value (NO to the step S603), then it is determined that the focal point evaluation value is generated from a low S/N image signal, the generation of the focus lens control signal from the focal point evaluation value is stopped and the previous focus lens control is kept (step S604), followed by terminating the process.

During the sampling cycle 504 for a focal point evaluation value in FIG. 5, an up-arrow indicates the case where the microcomputer 113 generates the control signal of the focus lens using a focal point evaluation value calculated by the focal point evaluation value calculation circuit 118, while a right arrow indicates the case where there is no use of the focal point evaluation value.

According to the present embodiment, the exposure evaluation value (second exposure evaluation value) of the image signal synthesized by the image synthesis circuit 108 is calculated and a focal point evaluation value decided to have a favorable S/N ratio is used to control the focus lens 103. This can increase the number of times of sampling the focal point evaluation values, thereby restraining a decrease in autofocus responsiveness by fast readout.

Next, a third embodiment of the present invention will be described. In this embodiment, the exposure evaluation value of an image signal synthesized by the image synthesis circuit 108 are calculated and a focal point evaluation value decided to have a favorable S/N ratio is used to control the focus lens 103. Further, image signals that have been subjected to additive synthesis by the image synthesis circuit 108 are once reset so that erroneous determination is reduced when a shake occurs due to the additive synthesis.

Figure 7:
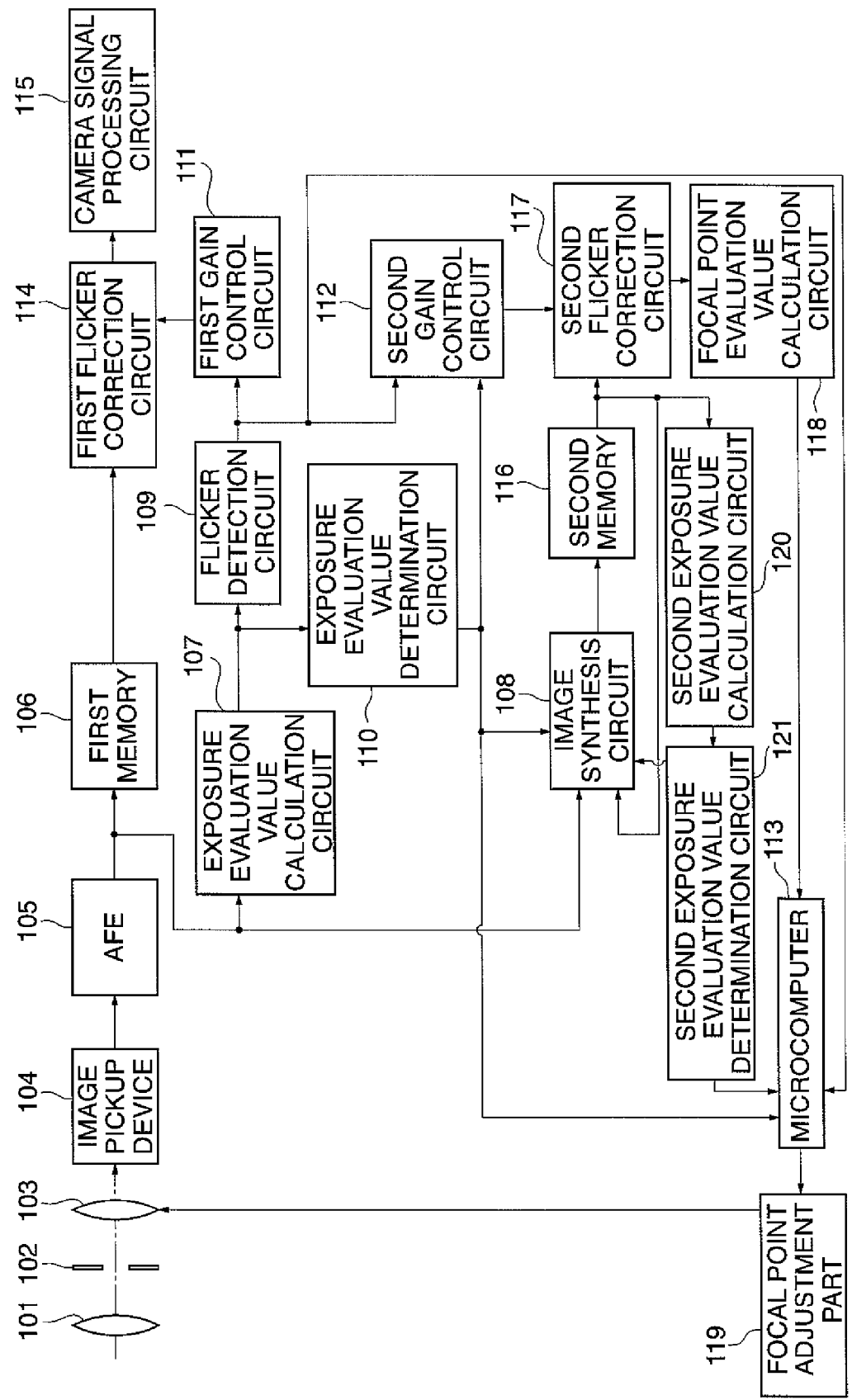
FIG. 7 is a block diagram schematically showing the configuration of an image pickup apparatus according to a third embodiment of the present invention.
Figure 8:
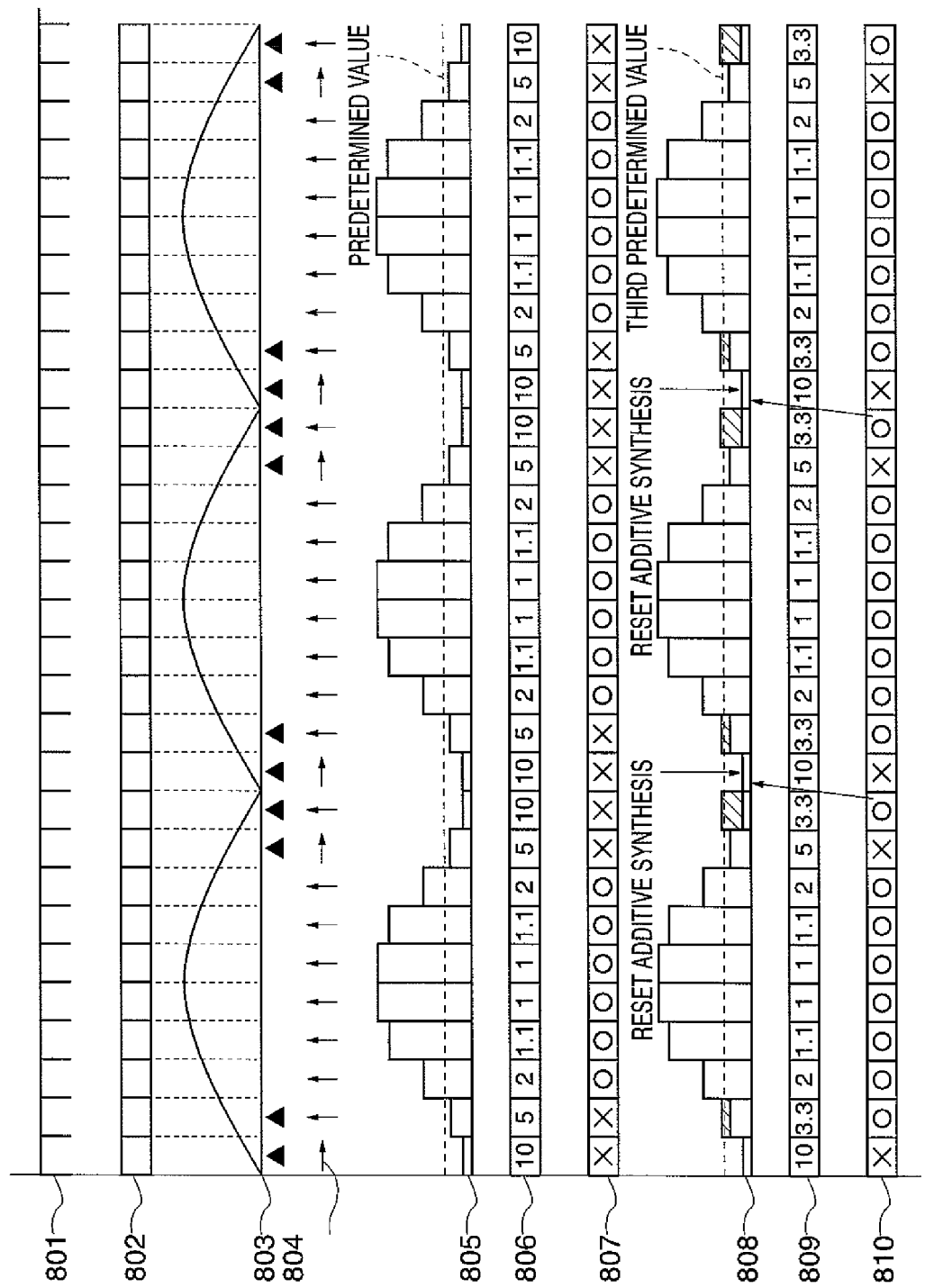
FIG. 8 is a timing chart illustrating the operation of the image pickup apparatus in FIG. 7.
Figure 9:
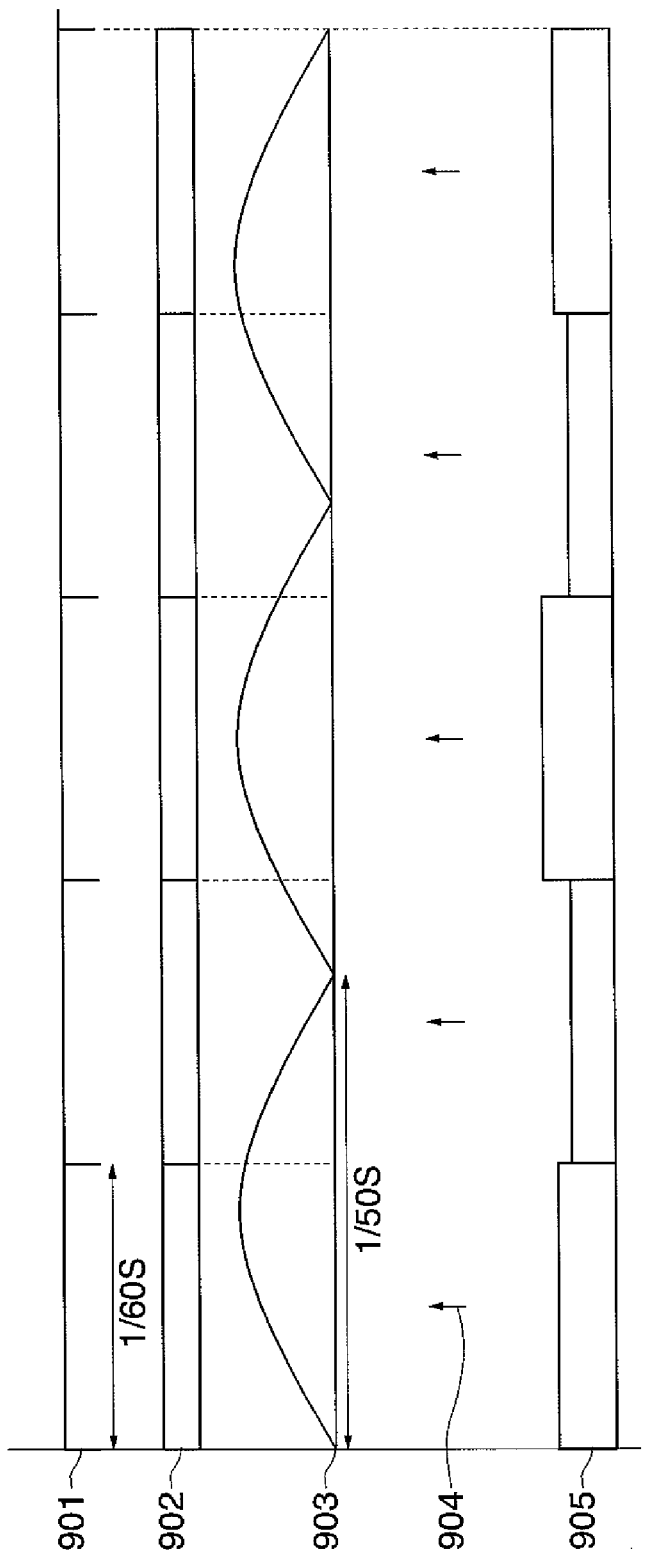
FIG. 9 is a diagram illustrating an effect of conventional fluorescent flickers when a cycle of readout from an image pickup device is $1/60$ sec. and a flicker cycle due to a power supply frequency is $1/50$ sec.
Figure 10:
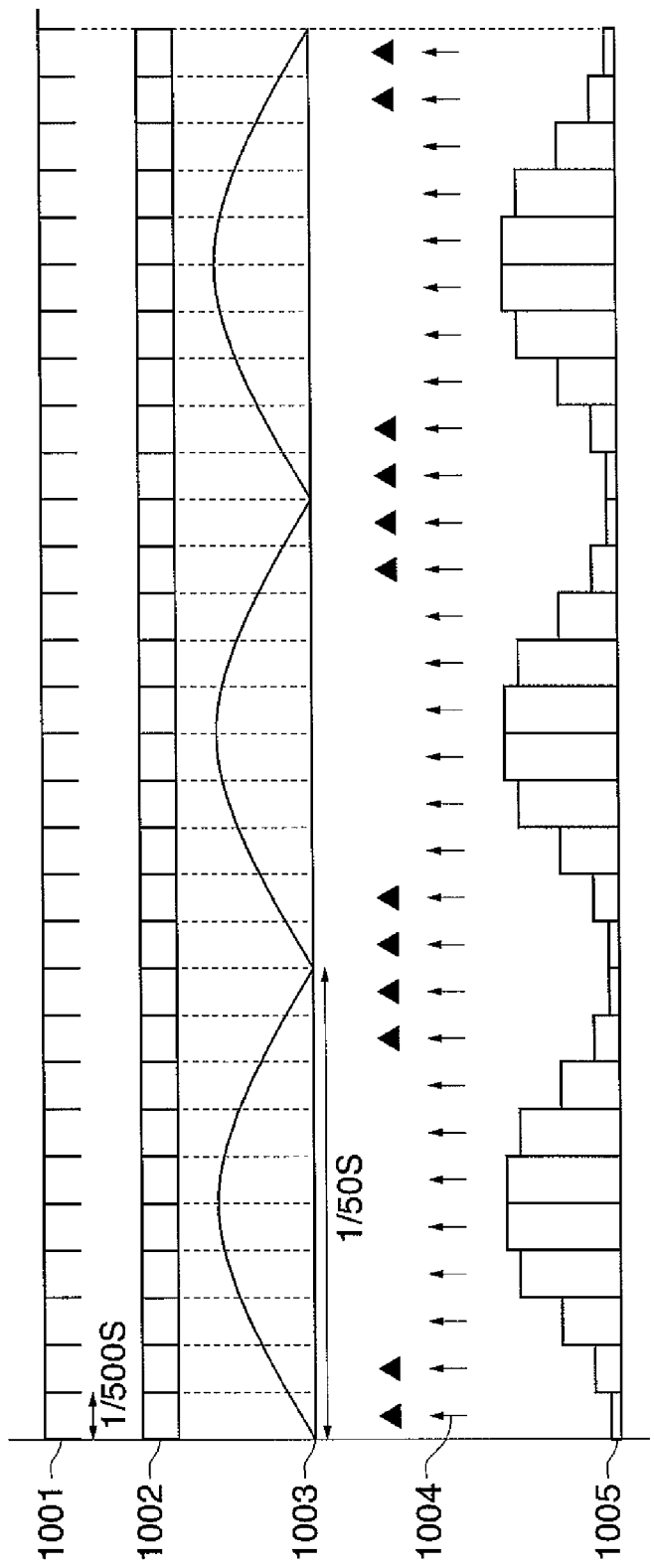
FIG. 10 is a diagram illustrating an effect of fluorescent flickers when a cycle of readout from an image pickup device is $1/500$ sec. and a flicker cycle due to a power supply frequency is $1/50$ sec. during fast readout from the image pickup device.

FIG. 7 is a block diagram schematically showing the configuration of an image pickup apparatus according to the third embodiment of the present invention. FIG. 8 is a timing chart illustrating the operation of the image pickup apparatus in FIG. 7.

An image pickup apparatus according to the second embodiment has fundamentally the same construction as the first embodiment described above, and therefore corresponding elements are designated by identical reference numerals and description thereof is omitted. Only different points will be described below.

In FIG. 7, the second exposure evaluation value calculation circuit 120 integrates the brightness values of image signals outputted from the second memory 116, calculates an exposure evaluation value in a frame, and outputs the evaluation value to the second exposure evaluation value determination circuit 121.

The second exposure evaluation value determination circuit 121 compares the exposure evaluation value outputted from the second exposure evaluation value calculation circuit 120 with a third predetermined value, and outputs the determination (comparison) result to the image synthesis circuit 108 and the microcomputer 113.

In FIG. 8, reference numeral 801 denotes a cycle of readout from the image pickup device 104, reference numeral 802 denotes accumulation time for the image pickup device 104, reference numeral 803 denotes brightness changes due to flickers of fluorescent light, reference numeral 804 denotes a cycle of sampling focal point evaluation values, reference numeral 805 denotes image signals outputted from the image pickup device 104, reference numeral 806 denotes values of a first flicker correction gain to eliminate an effect of the flickers of fluorescent light, reference numeral 807 denotes determination results by the exposure evaluation value determination circuit 110, reference numeral 808 denotes image signals outputted from the image synthesis circuit 108, reference numeral 809 denotes values of a second flicker correction gain to eliminate the effect of the flickers of fluorescent light, and reference numeral 810 denotes determination results by the second exposure evaluation value determination circuit 121. If the second exposure evaluation value determination result 810 is "o", i.e., the second exposure evaluation value is larger than the third predetermined value, additive synthesis of the image signals is once reset so that sampling of focal point evaluation values is performed.

According to the present embodiment, the exposure evaluation value of the image signal synthesized by the image synthesis circuit 108 is calculated and the focal point evaluation value decided to have a favorable S/N ratio is used to control the focus lens. Further, the image signals that have been subjected to additive synthesis by the image synthesis circuit 108 are once reset so that erroneous determination can be reduced when a shake occurs due to the additive synthesis.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-129405, filed May 15, 2007, which is hereby incorporated by reference herein in its entirety.

What is claimed is:

1. An image pickup apparatus comprising: a focus lens; an image pickup device;
a flicker detection unit adapted to detect flickering of ambient light from image signals output from said image pickup device;
a storage unit adapted to store the image signals output from said image pickup device;
an image processing unit adapted to process the image signals output from said image pickup device or the image signals stored in said storage unit depending on a detection result by said flicker detection unit;
a focal point adjustment unit adapted to adjust a position of said focus lens by selectively using any one of the image signals output from said image pickup device or the image signal processed by said image processing unit;
a determination unit adapted to determine a brightness level value of the image signal processed by said image processing unit; and
a prevention unit adapted to prevent said focal point adjustment unit from adjusting the position of said focus lens based on the image signal processed by said image processing unit when said determination unit determines that the brightness level value is equal to or smaller than a predetermined value,
wherein when said image pickup device performs reading images in a cycle shorter than a flickering cycle, said image processing unit performs image processing depending on the brightness of the image signals output from said image pickup device.

2. The image pickup apparatus according to claim 1, further comprising:
a correction unit adapted to correct the image signals output from said image pickup device dependent on a detection result by said flicker detection unit and a brightness level value of the image signal output from said image pickup device,
wherein the focal point adjustment unit is adapted to adjust the position of said focus lens based on the image signal corrected by said correction unit.

3. The image pickup apparatus according to claim 1, wherein said processing unit is adapted to synthesize the image signals output from said image pickup device and the image signals stored in said storage unit.

4. An image pickup apparatus comprising:
a detection unit adapted to detect flickering of ambient light from image signals output from an image pickup device;
a storage unit adapted to store the image signals output from said image pickup device when said image pickup device performs reading images in a cycle shorter than a flickering cycle;

an image processing unit adapted to process the image signals output from said image pickup device or the image signals stored in said storage unit depending on a detection result by said detection unit;

a focal point adjustment unit adapted to adjust a position of a focus lens by selectively using any one of the image signals output from the image pickup device or the image signal processed by said image processing unit;

a determination unit adapted to determine a brightness level value of the image signal processed by said image processing unit, wherein said focal point adjustment unit adjusts the position of the focus lens based on the image signal processed by said image processing unit when said determination unit determines that the brightness level value is larger than a predetermined value.

5. The image pickup apparatus according to claim 4, wherein said processing unit is adapted to synthesize the image signals output from said image pickup device and the image signals stored in said storage unit.

6. A control method of controlling an image pickup apparatus comprising:

a detection step of detecting flickering of ambient light from image signals output from an image pickup device;

a storage step of storing the image signals output from the image pickup device in a storage unit when the image pickup device performs reading images in a cycle shorter than a flickering cycle;

an image processing step of processing the image signals output from the image pickup device or the image signals stored in the storage unit depending on a detection result in said detection step;

a focal point adjustment step of adjusting a position of a focus lens based on at least one of the image signals output from the image pickup device or the processed image signal;

a determination step of determining a brightness level value of the image signal processed in said image processing step; and a prevention step of preventing the execution of adjusting the position of the focus lens based on the synthesized processed image signal in said focal point adjustment step when said determination step determines that the brightness level value is equal to or smaller than a predetermined value.

7. The control method according to claim 6, wherein said processing step synthesizes the image signals output from said image pickup device and the image signals stored in said storage unit.

8. An image pickup apparatus comprising:

a focus lens;

an image pickup device;

a flicker detection unit adapted to detect flickering of ambient light from image signals output from said image pickup device;

a storage unit adapted to store the image signals output from said image pickup device;

an image processing unit adapted to process the image signals output from said image pickup device or the image signals stored in said storage unit depending on a detection result by said flicker detection unit;

a focal point adjustment unit adapted to adjust a position of said focus lens by selectively using any one of the image signals output from said image pickup device or the image signal processed by said image processing unit;

a determination unit adapted to determine a brightness level value of the image signal output from said image pickup device; and a prevention unit adapted to prevent said focal point adjustment unit from adjusting the position of said focus lens based on the image signal processed by said image processing unit when said determination unit determines that the brightness level value is equal to or smaller than a predetermined value.

9. A control method of controlling an image pickup apparatus comprising:

a detection step of detecting flickering of ambient light from image signals output from an image pickup device;

a storage step of storing the image signals output from the image pickup device in a storage unit when the image pickup device performs reading images in a cycle shorter than a flickering cycle;

an image processing step of processing the image signals output from the image pickup device or the image signals stored in the storage unit depending on a detection result in said detection step;

a focal point adjustment step of adjusting a position of a focus lens based on at least one of the image signals output from the image pickup device or the processed image signal;

a determination step of determining a brightness level value of the image signal output from the image pickup device; and a prevention step of preventing the execution of adjusting the position of the focus lens based on the processed image signal in said focal point adjustment step when said determination step determines that the brightness level value is equal to or smaller than a predetermined value.

* * * * *